INVENTORS.
CHARLES W. GIBBS and
DARREL E. GIBBS
BY
ATTORNEY

Feb. 21, 1956                C. W. GIBBS ET AL                 2,735,135
                          FOWL SLAUGHTERING STAND
Filed Nov. 15, 1952                                        3 Sheets-Sheet 2

INVENTORS.
CHARLES W. GIBBS and
DARREL E. GIBBS
BY
ATTORNEY

Feb. 21, 1956  C. W. GIBBS ET AL  2,735,135
FOWL SLAUGHTERING STAND

Filed Nov. 15, 1952  3 Sheets-Sheet 3

INVENTORS.
CHARLES W. GIBBS and
DARREL E. GIBBS
BY
*H. A. McGrew*
ATTORNEY

United States Patent Office 2,735,135
Patented Feb. 21, 1956

2,735,135

FOWL SLAUGHTERING STAND

Charles W. Gibbs and Darrel E. Gibbs, Boulder, Colo.

Application November 15, 1952, Serial No. 320,672

8 Claims. (Cl. 17—11)

This invention relates to new and useful improvements in slaughter stands especially constructed for the slaughter and proper drainage of fowl, and an important object of the invention is to provide apparatus in which fowl can be suspended from their shanks in a restraining compartment and be slaughtered while so suspended with the proper degree of freedom of convulsive movements as will achieve thorough blood drainage without bruising and with body excretions confined within the apparatus.

Another important object of the invention is to provide a tapered restraining compartment in combination with means for suspending fowl at various selected elevations with respect to the taper of said compartment, whereby fowl of various sizes may be given the same degree of freedom of convulsive movements in the compartment by the relative positioning of the suspension means with respect to the compartment.

Another object of the invention is to provide a device of the above character which is equipped with a compartment in which the fowl is suspended, heads down and accessible through a slaughtering opening which is spring closed and opened to enable fast slaughtering and to prevent splattering of excretions outside of the device.

A further object of the invention is to provide the device with a trough for the immediate drainage of excretions flushed out of the device by a water spray which will flush the fowl and walls of the device to maintain both as clean and sanitary as is possible in such an operation.

A still further object of the invention is to provide an economical, strong and durable construction for such a device which will be a distinct asset to any establishment for the sanitary and almost odorless slaughter of a plurality of fowl at one time.

Figure 1:
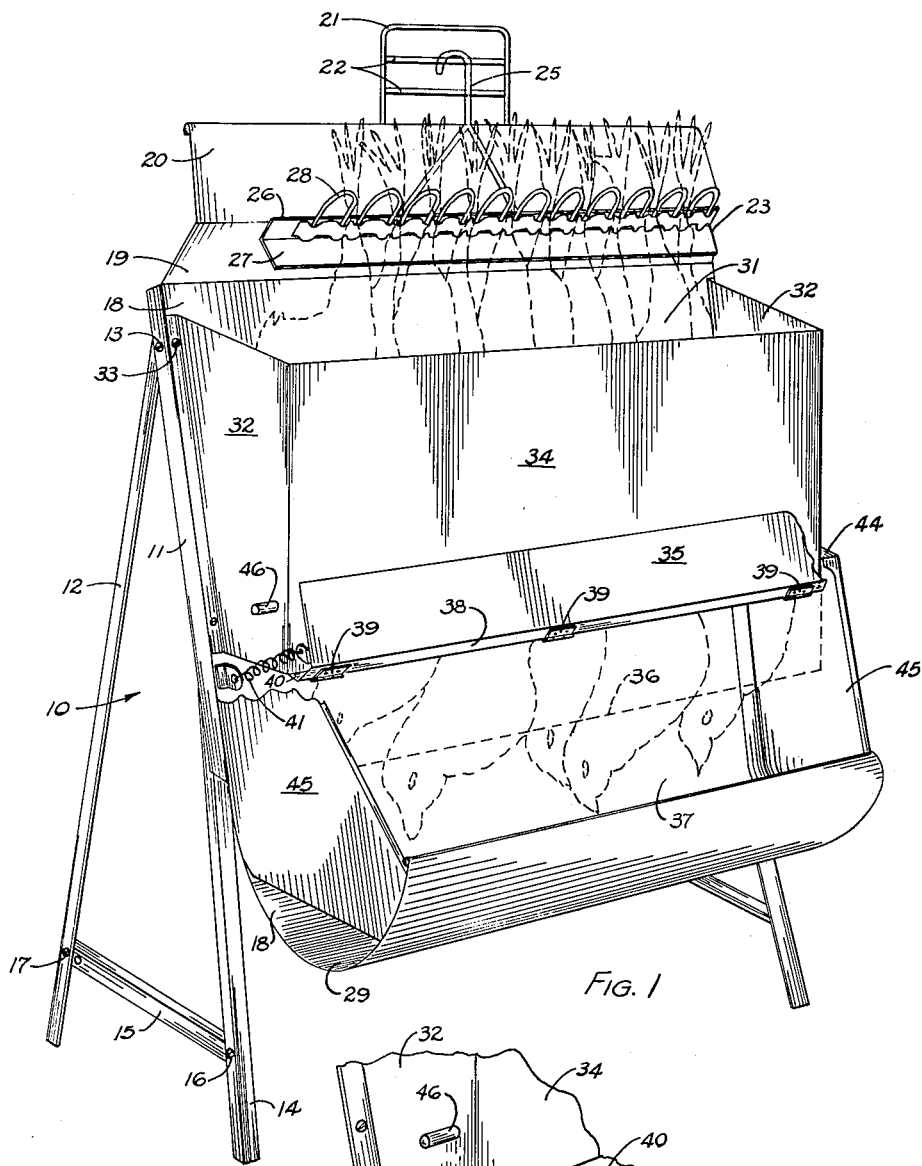
Figure 1A:
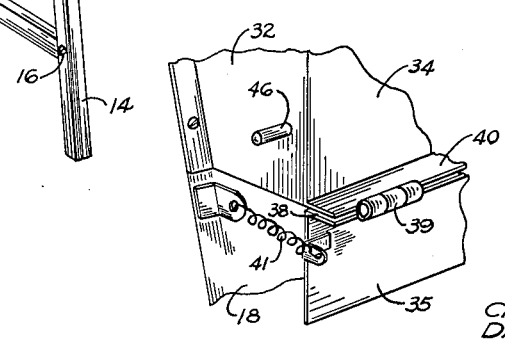
Figure 2:
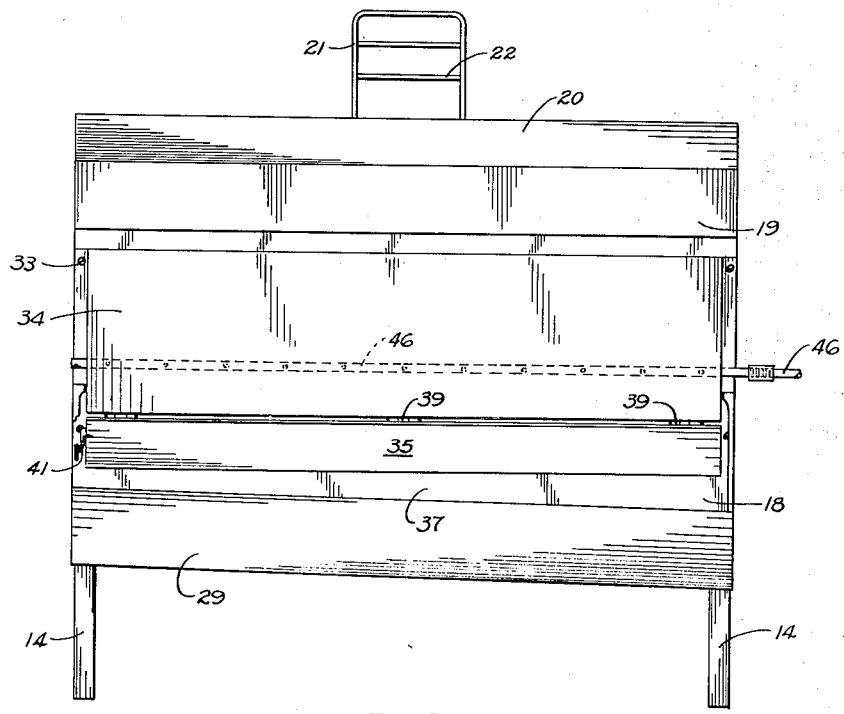
Figure 3:
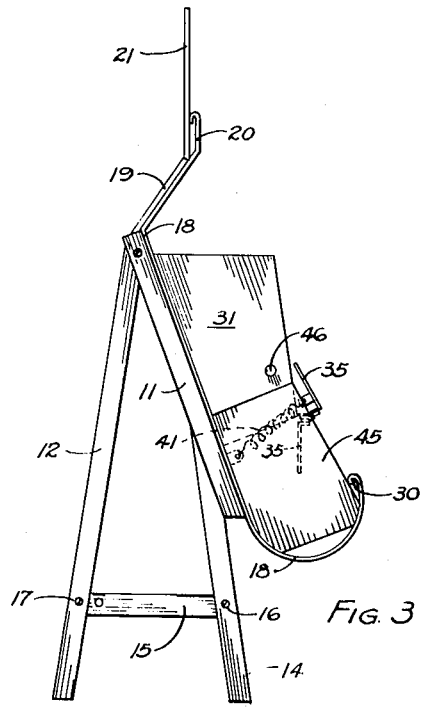
Figure 5:
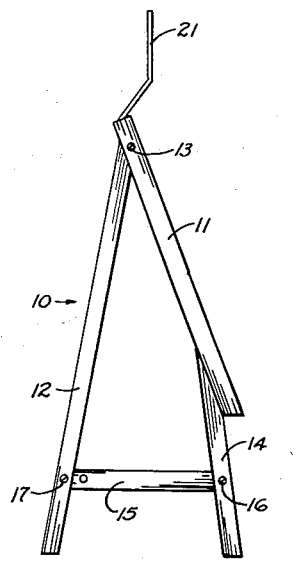
Figure 4:
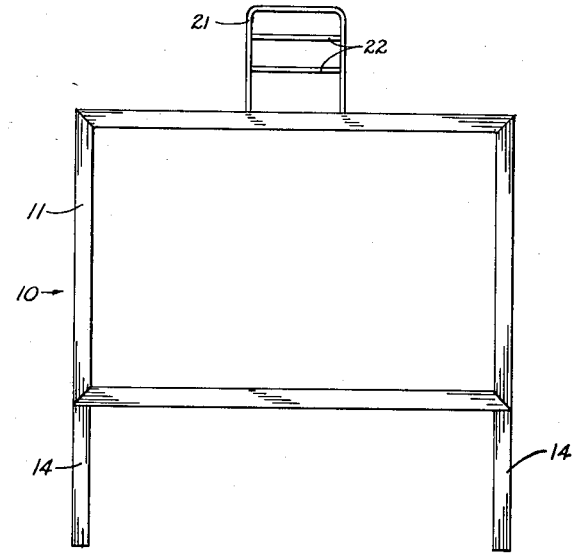
Figure 6:
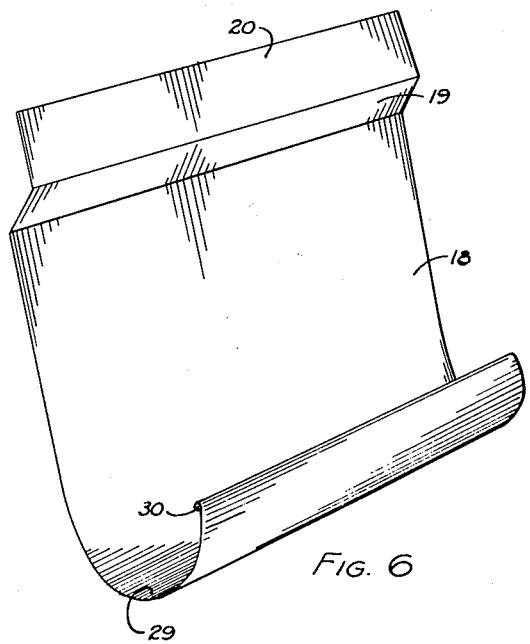
Figure 7:
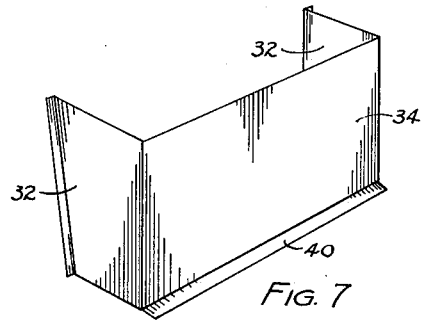
Figure 8:
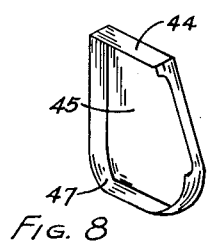

Other objects and advantages of the invention will become apparent during the course of the following description:

In the accompanying drawings forming a part of the description and wherein like numerals are employed to designate like parts throughout the several views:

Fig. 1 is a perspective view of the device showing a plurality of fowl suspended therein in position for slaughtering, and with the anti-splash shield raised for the fowl sticking or slaughtering operation, Fig. 1a is an enlarged fragmentary perspective view of one end portion of the shield and associated parts, with the shield being shown in closed position, Fig. 2 is a front elevation of the apparatus with the shield lowered or in closed position, Fig. 3 is an end elevation of the apparatus with the shield in a raised or open position, Fig. 4 is a front elevation of the frame of the apparatus, Fig. 5 is a side elevation of the same, Fig. 6 is a perspective view of the back wall of the compartment and trough of the apparatus, Fig. 7 is a similiar view of the stamping showing the front and side walls of the compartment; and Fig. 8 is a perspective view of one of the end walls of the trough.

Referring now more particularly to the drawings, wherein for the purpose of illustration and not limitation is shown one embodiment of the invention, the numeral 10 designates a supporting easel-like frame composed of a rectangular frame 11 supported at an upwardly inclined angle at a suitable elevation upon a floor by means of a pair of long rear legs 12 hinged at their upper ends to the upper ends of the sides of frame 11 as at 13 whereby they may be swung flat against the back of the frame 11 for compactness in transportation or extended as shown for erection. The frame 11 is also supported by a pair of shorter front legs 14 which are rigidly connected to the bottom of the frame 11. A cross brace 15 between each pair of legs may be hinged at 16 to the front legs and adjustably connected at 17 with the rear legs 12 whereby the rear legs can be swung in or out on their pivots 13 to vary the inclination of the frame 11 as desired. This frame and the legs may be made from angle or channel iron or any other suitable material.

Secured to the rectangular frame 11 is a backing plate 18, preferably of light sheet metal which assumes the same inclination as the easel frame. This plate or sheet 18 is shown separate in Fig. 6 and can be a metal stamping having a generally flat body portion with its upper part formed into fowl suspension means by being bent forwardly at an angle to provide an excretion baffle 19 terminating in a vertically extending supporting top flange 20. To the back of this top 20 or to the top of the frame 11 at the center thereof, is secured vertical suspension means 21 of ladder-like form having vertically spaced horizontal rungs or suspension elements 22 for supporting fowl supporting racks at various elevations whereby the fowl can be supported at the desired elevation upon the backing plate 18 and in a restraining compartment to be presently described. One important thing about this suspension means 21 is that it be offset forwardly whereby it will overhang the inclined backing plate 18 to properly support fowl heads down with its back toward the plate 18. In Fig. 1 a fowl supporting rack 23 is shown positioned above the open top of the aforesaid restraining compartment for supporting a plurality of fowl in side by side contact with each other. This rack 23 per se forms no part of the present invention and is illustrated merely to give a full and complete disclosure of the manner of practising the instant invention. It is composed generally of an angle iron base 27 with a suspension hook 25 adapted to hook over any selected rung 22 of the suspension means 21. The upper arm 26 of this angle iron is adapted to rest flat against the baffle 19 while its other arm 27 extends outwardly at approximately right angles to the baffle 19. The upper arm 26 has a plurality of spaced U-shaped spring loops 28 secured thereto, and between each pair of these loops, a fowl leg is wedged for releasably holding the fowl as shown. It will be noted that the fowl shown in dotted lines in Fig. 1 have their shanks near the hocks pinched between the loops 28, with the backs of the fowl arranged next to the backing plate 18. Fowl, such as poultry, held in this manner are rendered more helpless than when held in most other positions, due to the weight of the fowl being imposed against the natural flexing of the joint between the shank and the hock.

The lower portion of the backing plate 18 is bent forwardly and upwardly in arcuate form to provide a drainage trough 29 the bottom of which inclines downwardly from one side of the frame to the other side to cause drainage by gravity into a suitable cesspool or refuse receptacle. The free edge 30 of this trough is turned inwardly or beaded to afford a smooth finish and also prevent spillage during cleaning. Thus the backing plate 18 forms a smooth downwardly inclined wall from which blood and excretions will automatically drain by gravity.

In order to permit limited movements of the fowl in their death convulsions for thorough and proper blood drainage, which is not possible in the usual frusto-conical fowl holders which wedge the fowl therein and prevent any movement at all, there is provided an elongated fowl compartment 31 having an open top and an open bottom and is of sufficient size to contain five or more fowl for slaughtering at one time. This compartment is formed by fastening the outwardly flanged ends 32 of a three sided metal stamping to the two side margins of the backing plate 18 by bolts 33 or the like at a position above the trough 29. The front wall 34 of this compartment is arranged substantially in a vertical plane and at a distance from the inclined backing plate 18 as will freely receive the fowl without wedging and will permit limited freedom of movements of the fowl in their death convulsions to achieve complete drainage of blood from the fowl. This is an important characteristic of the restraining compartment 31 as it has been found that complete drainage of the blood from the fowl necessitates that the fowl be not wedged against movement as it is in the frusto-conical holders, but permitted sufficient freedom of movements so as not to bruise, yet enough movement that the death convulsions will eliminate all blood therefrom. Due to the back wall of the compartment being inclined relative to the front wall 34, the walls are downwardly converging with the top opening thereof having a greater area than the bottom opening. This structural feature and the fact that the rack 23 is vertically adjustable on the rungs 22 of the suspension means, allows various sized fowls to be adjustably suspended vertically in the restraining compartment 31 so that their keel or breast bones just touch the front wall while their backs engage the back plate 18 allowing them vertical movements and slight fluttering of wings to the degree found most effective for the particular breed or size being slaughtered and without danger of bruising, yet permitting complete blood drainage.

The device is so proportioned that the fowl, prior to being killed or being "stuck" through the brain or neck, hang suspended by their shanks in the restraining compartment and with their heads and necks down and arranged just below the bottom edge of the front wall 34 of the compartment to be visible and accessible for killing between this lower edge and the top edge of the drainage trough 29. A flat shield plate 35 is hinged to the lower edge or flange 40 of the front wall 34 to swing upwardly to an open position as shown in Figs. 1 and 3 to expose the necks and heads of the fowl for killing and to swing downwardly to a substantially vertical closed position as shown in Figs. 1a and 2 and by the dotted line 36 in Fig. 1 so as to leave a sight space or opening 37 between the lower edge of the shield 35 and the top edge of the trough 29 for the operator to see when the fowl have been completely drained and yet will not permit blood and water to be splattered out of the device. The upper edge of this shield is bent at right angles into a forwarnly extending flange 38 to be hingedly connected by hinges 39 to the forwardly extending horizontal flange 40 bent from the lower edge of the forward wall 34 of the compartment 31, whereby these two flanges abut flatwise when the shield plate 35 is moved to a closed position, see particularly Fig. 1a, thereby preventing excessive inward swinging movement of the shield to hold it in upright alignment with the front wall 34 of the compartment 31. With larger fowl having greater leg and body length, it will be seen that the suspension rack 23 is hooked on the higher rungs 22 whereby their heads and necks are disposed behind the shield 35, whereas with smaller fowl having less leg and body length, the rack 23 is hooked on one of the lower rungs 22 to similarly dispose their heads and necks behind the shield 35 with their keels disposed further down in the tapering compartment 31. Thus, the suspension support 21 makes it possible to adjust fowl vertically in this tapered compartment to obtain practically the same restriction of convulsive movements of the fowl irrespective of their size.

This shield plate 35 is flipped into open or closed position by the operator's finger and is resiliently held there by a coiled spring 41 having one end secured to a clip 42 fastened to one end of the plate 35 near the hinge thereof and its other end secured to a clip 43 connected to the frame 11 below the pivot of the hinge. Thus, when flipped by the operator, this spring will move the shield 35 to either open or closed position and hold it there until released again by the operator. The spring 41 is covered or concealed by the upper inturned flange 44 of one end plate 45 shown in detail in Fig. 8. This flange 44 abuts the end wall 32 of the compartment 31 while the end plate 45 has front and rear flanges 47 secured to the side edges of the back plate 18 and trough 29 to close the sides of the space between the restraining compartment 31 and the trough as well as to partially close the ends of the trough 29. An end plate 45 is provided for each end of the device and both plates are spaced above the bottom of the trough as shown in Fig. 1. This provides the low end of the trough with an outlet opening for drainage of the device into a suitable receptacle or cesspool as the trough is spaced above the floor level a refuge receptacle can be readily placed beneath its outlet.

In order that the apparatus can be kept clean and sanitary at all times, a water pipe 46 is extended through the side walls 32 of the restraining compartment 31 to extend lengthwise within the lower portion of said compartment. This pipe is provided with spray perforations whereby water under pressure will spray against the inner walls of the compartment, the baffle 19 and upon the dirty portions of the fowl to flush blood and excretions speedily from the device. When the fowl is killed, convulsions cause rear end excretions to be discharged with some force, and these are deflected back into the compartment by the baffle 19.

When the fowl is suspended in the compartment with their heads behind the shield 35, the latter swung upwardly where it remains in open position until the fowl has been stuck. The shield 35 is then flipped down to closed position to deflect blood which will drip from the lower edge thereof, augmented by the spray water, to fall into the drainage trough. After the fowl has drained off all blood, the rack 23 is lifted from the suspension means 21 and is transported with the drained fowl to the hot water tank and feather plucking departments after which they are drawn and dressed.

From the foregoing description it is believed that the construction and operation of the device are entirely clear. It is to be understood that various changes in the size, shape and construction of the various parts of the device may be varied without departing from the spirit of the invention or the scope of the appended claims. It will also be apparent that the legs of the device can be made of different length to arrange the device at different elevations from the floor, or can be eliminated entirely and the device hung on the wall at such elevation as to obviate stooping by the operator to stick the fowl.

We claim:

1. A slaughter and drainage apparatus comprising in combination an open top and open bottom compartment adapted to substantially enclose and restrain the dying movements of one or more fowl bodies, said compartment formed with opposed end walls and downwardly converging front and back walls with the top opening thereof having a greater area than said bottom opening, a trough positioned beneath the open bottom of said compartment, suspension means supported by said apparatus and positioned above the open top of said compartment, and a rack supported by said suspension means, said rack being operatively associated with said compartment and located above said open top by which one or more fowl bodies are adapted to be suspended by the shanks thereof in head down position with limited freedom of convulsive movements within said compartment.

2. Apparatus as defined in claim 1 wherein the suspension means is provided with a plurality of vertically displaced suspension elements by which said rack may be supported at different heights to accommodate various sized fowls within said compartment.

3. Apparatus as defined in claim 1 wherein spray means are positioned within the lower portion of said compartment.

4. A slaughter and drainage apparatus comprising in combination an open top and open bottom compartment adapted to substantially enclose and restrain the dying movements of one or more fowl bodies, said compartment formed with opposed end walls and downwardly converging front and back walls with the top opening thereof having a greater area than said bottom opening, said back wall provided with an upper extension which is inclined forwardly in a direction over a portion of said open top to provide an excretion baffle, a trough provided with an inclined bottom portion positioned beneath the open bottom of said compartment, suspension means mounted on said apparatus and positioned above the open top of said compartment, and a rack supported by said suspension means, said rack being operatively associated with said compartment and located above said open top by which one or more fowl bodies are adapted to be suspended by the shanks thereof in head down position with limited freedom of convulsive movements within said compartment.

5. Apparatus as defined in claim 4 wherein said back wall, excretion baffle and trough are formed of a single sheet of material.

6. A slaughter and drainage apparatus comprising in combination an open top and open bottom compartment adapted to substantially enclose and restrain the dying movements of one or more fowl bodies, said compartment formed with opposed end walls and downwardly converging front and back walls with the top opening thereof having a greater area than said bottom opening, a plate pivotally mounted adjacent to the lower edge of said front wall for respective adjusting movement to a raised position and to a lowered position, a trough provided with an inclined bottom portion positioned beneath the open bottom of said compartment, suspension means supported by said apparatus and positioned above the open top of said compartment, a rack supported by said suspension means, said rack being operatively associated with said compartment and located above said open top by which one or more fowl bodies are adapted to be suspended by the shanks thereof in head down position with limited freedom of convulsive movements within said compartment, and securing means for maintaining said plate in said adjusted positions.

7. A slaughter and drainage apparatus comprising in combination an open top and open bottom compartment adapted to substantially enclose and restrain the dying movements of one or more fowl bodies, said compartment formed with opposed end walls and downwardly converging front and back walls with the top opening thereof having a greater area than said bottom opening, a plate pivotally mounted adjacent to the lower edge of said front wall for respective adjusting movement to a raised position and to a lowered position, a trough provided with an inclined bottom portion positioned beneath the open bottom of said compartment, suspension means supported by said apparatus and positioned above the open top of said compartment, a rack supported by said suspension means, said rack being operatively associated with said compartment and located above said open top by which one or more fowl bodies are adapted to be suspended by the shanks thereof in head down position with limited freedom of convulsive movements within said compartment, and securing means for maintaining said plate in said adjusted positions.

8. A slaughter and drainage apparatus comprising in combination an open top and open bottom compartment adapted to substantially enclose and restrain the dying movements of one or more fowl bodies, said compartment formed with opposed end walls and downwardly converging front and back walls with the top opening thereof having a greater area than said bottom opening, said back wall provided with an upper extension which is inclined forwardly in a direction over a portion of said open top to provide an excretion baffle, a plate pivotally mounted adjacent to the lower edge of said front wall for respective adjusting movement to a raised position and to a lowered position, spray means positioned within the lower portion of said compartment, a trough provided with an inclined bottom portion positioned beneath the open bottom of said compartment, adjustable suspension means mounted on said apparatus and positioned above the open top of said compartment, a rack supported by said suspension means, said rack being operatively associated with said compartment and located above said open top by which one or more fowl bodies are adapted to be suspended by the shanks thereof in head down position with limited freedom of convulsive movements within said compartment, and securing means for maintaining said plate in said adjusted positions.

References Cited in the file of this patent

UNITED STATES PATENTS

| 592,262 | Still | Oct. 26, 1897 |
| 845,982 | Smith | Mar. 5, 1907 |
| 1,346,878 | Case et al. | July 20, 1920 |
| 1,866,683 | Tinnes | July 12, 1932 |
| 2,490,761 | McDowell, Jr. | Dec. 6, 1949 |
| 2,518,231 | Fudge | Aug. 8, 1950 |
| 2,570,143 | Merrick | Oct. 2, 1951 |

FOREIGN PATENTS

| 164,639 | Great Britain | June 16, 1921 |
| 700,434 | France | Dec. 23, 1930 |
| 801,425 | France | May 16, 1936 |